United States Patent [19]

Kim

[11] Patent Number: 5,218,438
[45] Date of Patent: Jun. 8, 1993

[54] PICTURE APERTURE CORRECTION CIRCUIT

[75] Inventor: Jeong-hun Kim, Seoul, Rep. of Korea

[73] Assignee: SamSung Electronics Co., Ltd., Suwon, Rep. of Korea

[21] Appl. No.: 764,835

[22] Filed: Sep. 24, 1991

[30] Foreign Application Priority Data

Sep. 27, 1990 [KR] Rep. of Korea .................... 90-15416

[51] Int. Cl.$^5$ .......................... H04N 5/208; H04N 5/14
[52] U.S. Cl. ...................................... 358/162; 358/96
[58] Field of Search ................ 358/162, 166, 167, 36, 358/37, 96, 39

[56] References Cited

U.S. PATENT DOCUMENTS

| | | | |
|---|---|---|---|
| 3,789,133 | 1/1974 | Kline | 358/37 |
| 4,142,211 | 2/1979 | Faroudja | 358/167 |
| 4,360,830 | 11/1982 | Poetsch et al. | 358/162 |
| 4,839,725 | 6/1989 | Ueda | 358/160 |

FOREIGN PATENT DOCUMENTS

| | | | |
|---|---|---|---|
| 58-038074 | 3/1983 | Japan | 358/162 |
| 2067045 | 7/1981 | United Kingdom | 358/162 |

*Primary Examiner*—James J. Groody
*Assistant Examiner*—Safet Metjahic
*Attorney, Agent, or Firm*—Robert E. Bushnell

[57] ABSTRACT

A picture aperture correction circuit compensates aperture signal strength to add the compensated aperture component to the video signal. The circuit comprises an input terminal for entering a luminance signal, an aperture signal detector for detecting an aperture signal from the luminance signal supplied to the input terminal, an aperture level regulator to regulate the aperture signal to have variation of a specified slope, a level limiter section to limit the levels of the regulated signal to a specified level, a first adder that adds the limited level aperture signal to the detected aperture signal, and a second adder that adds the luminance signal supplied at the input terminal with the aperture signal from the first adder and generates an aperture corrected luminance signal.

20 Claims, 6 Drawing Sheets

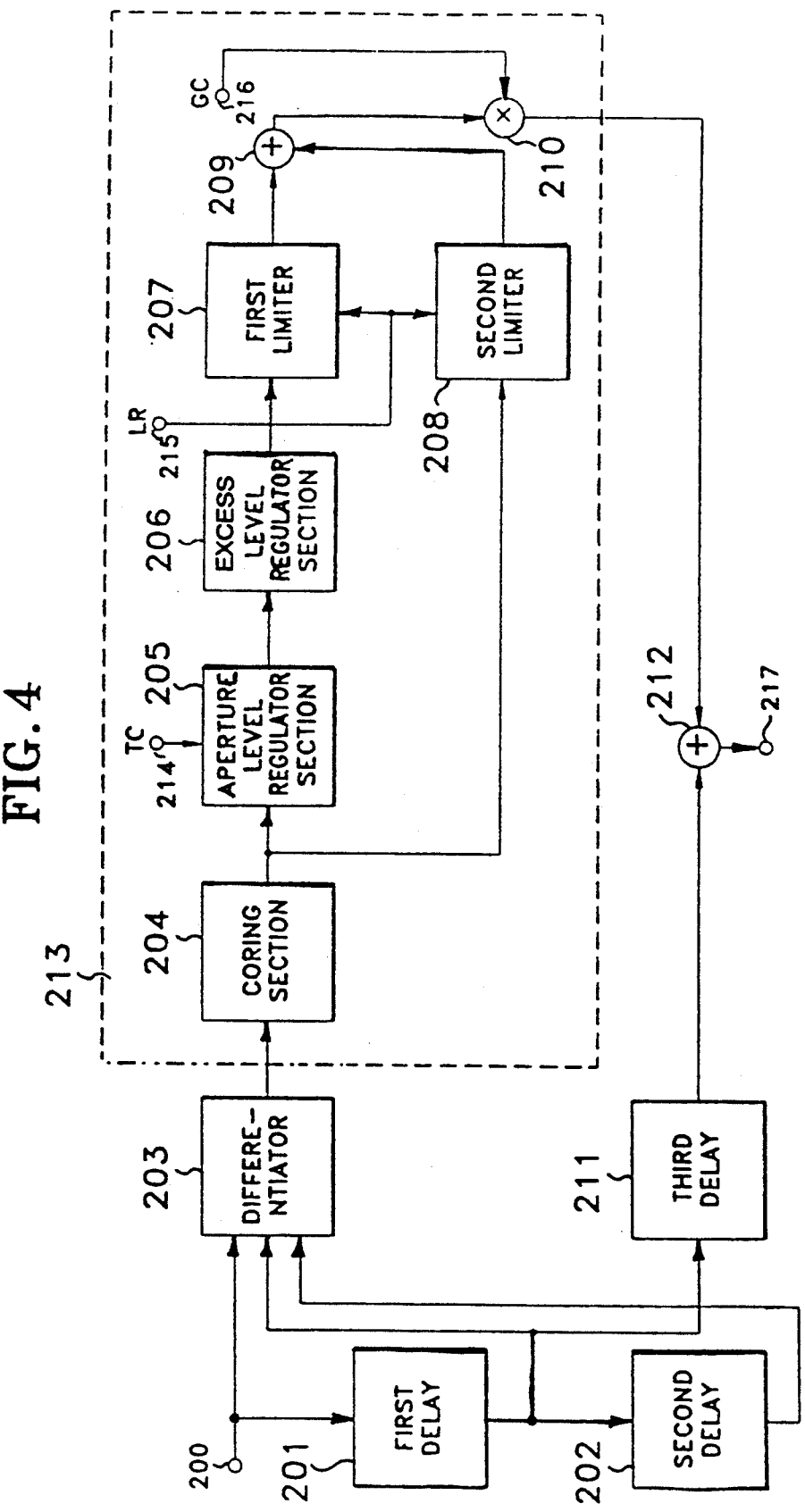

PICTURE APERTURE CORRECTION CIRCUIT

BACKGROUND OF THE INVENTION

The present invention relates to a circuit for emphasizing the aperture of an image in a video screen display system and in particular, to a circuit that compensates the level of the aperture component to add the compensated aperture component to the video signal.

The low transition level of an ordinary video signal can become deteriorated during transmission through a transmission media (cable/atmosphere), recording onto a record media or during reproduction. Correcting the aperture of a video signal to emphasize the outline of a picture before transmission and recording is done to prevent loss at low transition levels. Furthermore, an aperture correction circuit that corrects the aperture of a picture improves the picture resolution by separating the aperture component having level differences between the pixels from the video signal for adding to the original video signal. However, because the conventional aperture correction circuit does add the aperture component separated from the video signal to the original video signal as a separated aperture component that is not compensated when the level of the aperture component is low, the corrected video signal does not have a sufficient degree of resolution. An explanation of the problems with the conventional aperture correction circuit follows with reference to the attached illustrations.

FIG. 1 is a circuit diagram of a conventional vertical aperture correction circuit, FIG. 2 is a circuit diagram of a conventional horizontal aperture correction circuit, and FIGS. 3A through 3D show the output wave forms of the respective sections illustrated in FIGS. 1 and 2.

First, FIG. 1 will be explained with reference to FIG. 3. At input terminal 10, a luminance signal as shown in FIG. 3A is applied. Two dot broken-line surrounded section 34, composed of two line delays 12, 14, adder 16 and subtracter 18, is a differentiation circuit for detecting the aperture component as shown in FIG. 3B from the level transition section as in FIG. 3A. Low pass filter 20 removes high frequency noise signals included in the aperture component from the differentiation circuit and applies the aperture component, free of high frequency noise, to coring section 22. As shown in FIG. 3C, coring section 22 removes that aperture component within a predetermined level range of positive and negative (+,−) with O as a reference, from the overall aperture component from the low-pass filter 20 to supply the resultant signal to the gain regulator section 24. Gain regulator section 24 amplifies the aperture component from the coring section 22 to regulate the aperture component's gain.

Additionally, limiter 26 limits the amplified aperture component input from the gain regulator section 24 to a certain positive (+) and negative (−) level and applies the limited aperture component to adder 30. Delay 28 delays the luminance signal entered from the line delay 12 by the amount of propagation delay time in the circuits consisting of line delay 14 adder 16, subtracter 18, low pass filter 20, coring section 22, gain regulator section 24 and limiter 26 for output to adder 30. Adder 30 adds to the luminance signal from delay 28 the aperture component from limiter 26 and as in FIG. 3D, outputs an aperture corrected luminance signal through output terminal 32.

Secondly, FIG. 2 will be explained in detail with reference to FIG. 3. In FIG. 2, at input terminal 100, a luminance signal is applied as in FIG. 3A. Band pass filter 102 detects the aperture component as in FIG. 3B from the level transition section of the luminance signal as in FIG. 3A being applied to input terminal 100 and applies the detected aperture component to coring section 104. Here, the aperture component detected in the band pass filter 102 exists in the horizontal direction. Therefore, band pass filter 102 includes a low pass filter and a differentiation circuit where two pixel delays are inserted instead of two line delays 12, 14 as shown in the differential circuit of FIG. 1. As shown in FIG. 3C, coring section 104 removes the positive (+) and negative (−) aperture component existing within a certain level range with reference to a "O" level from the aperture components in the band pass filter 102 and applies resultant signal to gain regulator section 106. Gain regulation section 106 amplifies the aperture component from coring section 104 and inputs the amplified aperture component to limiter 108. Limiter 108 limits the amplified aperture component from the gain regulator section 106 to within a certain range level of plus (+) or (−) to supply the level limited aperture component to adder 112 Additionally, delay 110 causes a delay to the luminance signal applied at the input terminal 100 to the extent of the propagation delay time in the band pass filter 102, coring section 104, gain regulator section 106 and limiter 108 and supplies it to adder 112. Then, adder 112 adds the aperture component from limiter 108 to the luminance signal from delay 110 and as in FIG. 3D, transmits an aperture corrected luminance signal via output terminal 114.

As mentioned above, the conventional aperture correction circuit is not able to correct the aperture sufficiently when the transition level is low because it adds detected aperture component having a level corresponding to the transition level from the luminance signal to the original transition level from the luminance signal to the original luminance signal as a non-compensated condition. Therefore, the conventional aperture correction circuit is not able to correct the aperture of an video signal to have a sufficient degree of resolution.

SUMMARY OF THE INVENTION

Therefore, the object of the present invention is to provide an aperture correction circuit that can bring about a sufficient degree of resolution in the video signal by adaptively compensating the aperture signal detected from within the luminance signal by responding in accordance with its strength.

In order to achieve the above stated purpose, the present invention comprises an input terminal to input the luminance signal, an aperture detection means to detect the aperture signal from the luminance signal applied to the input terminal, a level regulation means to regulate the strength of the detected aperture signal to have a specified variation of slope, a level limiter means to limit the level regulated aperture signal to a specified level, a first adder for adding the level limited aperture signal to the detected aperture signal, and a second adder for adding the aperture signal from the first adder with the luminance signal applied to the input terminal to generate an aperture corrected luminance signal.

BRIEF DESCRIPTION OF THE DRAWINGS

The above object and other advantages of the present invention will become more apparent by describing in detail the preferred embodiment of the present invention with reference to the attached drawings in which:

FIG. 4 is a circuit diagram showing an embodiment of a vertical aperture correction circuit according to the present invention.

DETAILED DESCRIPTION OF PREFERRED EMBODIMENT

Figure 1:
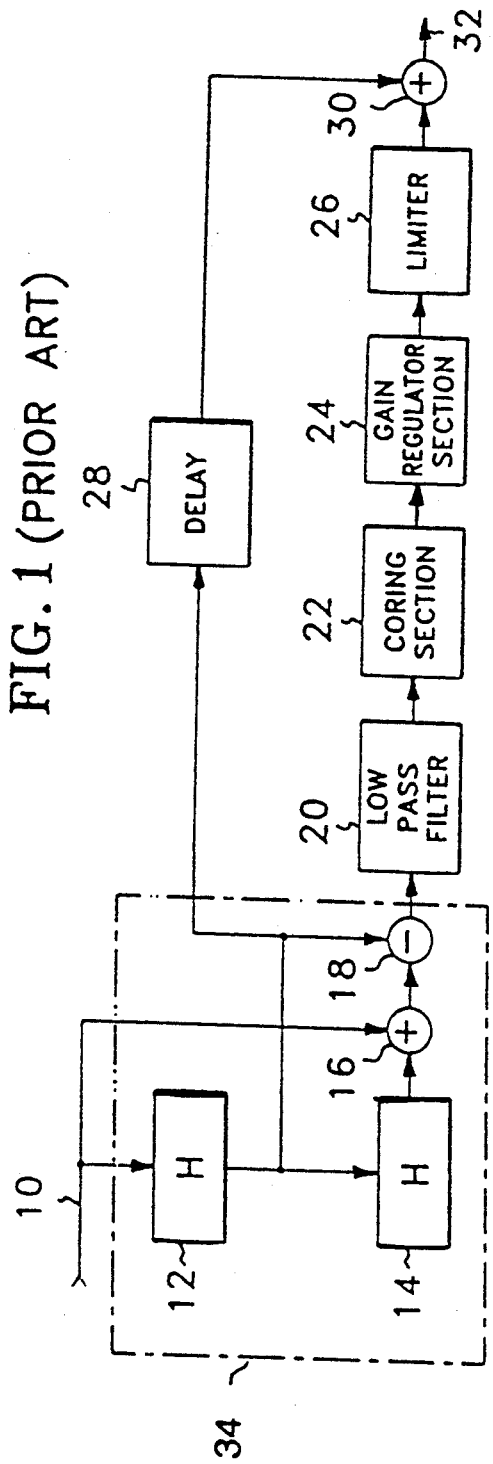
FIG. 1 is a circuit diagram of a conventional vertical aperture correction circuit.
Figure 2:
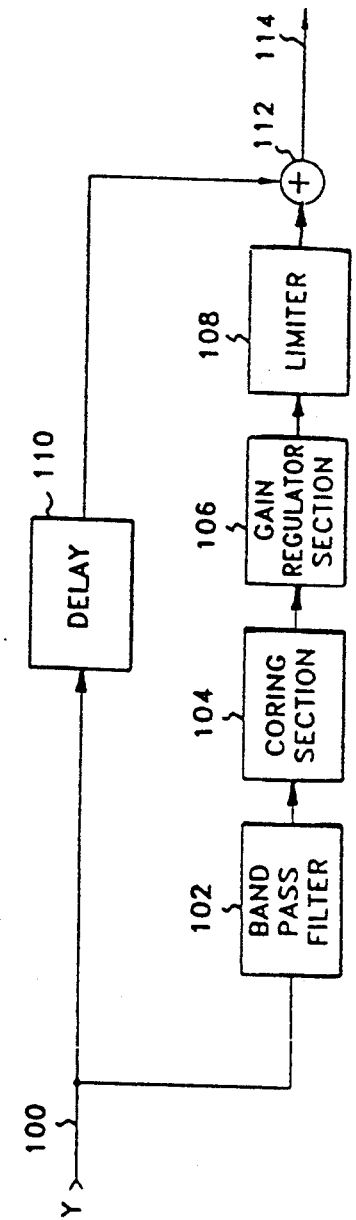
FIG. 2 is a circuit diagram of a conventional horizontal aperture correction circuit.
Figure 3A:
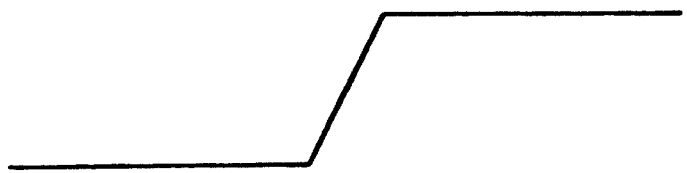
FIGS. 3A to 3D illustrate output wave forms of the respective sections of FIGS. 1 and 2.
Figure 3B:
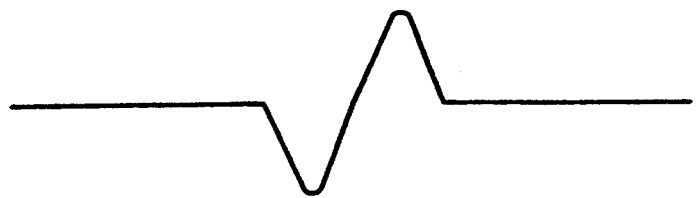
Figure 3C:
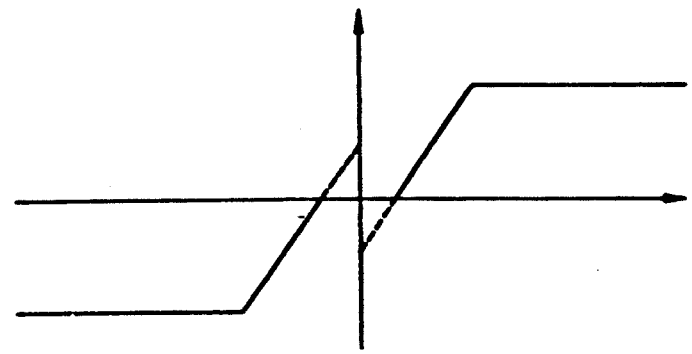
Figure 3D:
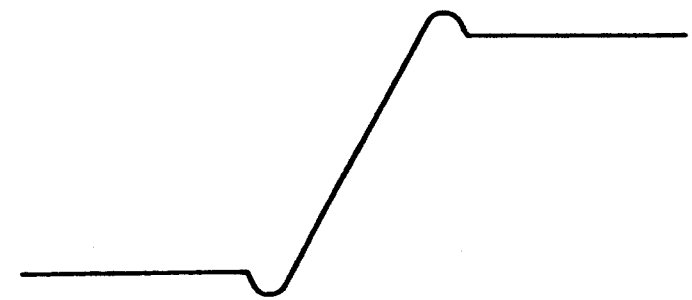

First embodiment of a picture aperture correction circuit according to the present invention is described in detail with reference to FIGS. 4 and 5.

In FIG. 4, first input terminal 200 is connected to the luminance signal source (not shown) to input the luminance signal. In addition, first input terminal 200 is connected to the input terminal of first delay 201 and first input terminal of differentiator 203. The output terminal of first delay 201 is connected to the second input terminal of differentiator 203, input terminal of second delay 202, and an input terminal of third delay 211. The output of second delay 202 is connected to the third input terminal of differentiator 203. The output terminal of differentiator 203 is connected to input terminal of coring section 204. The output terminal of coring section 204 is connected to a first input terminal of aperture level regulator section 205 and a first input terminal of second limiter 208. The output terminal of aperture level regulator section 205 is connected to an input terminal of excess level regulator section 206. The output terminal of excess level regulator section 206 is connected to a first input terminal of first limiter 207. The output terminal of first limiter 207 is connected to first input terminal of first adder 209. An output terminal of second limiter 208 is connected to a second input terminal of first adder 209. The output terminal of first adder 209 is connected to first input terminal of multiplier 210. The output terminal of multiplier 210 is connected to second input terminal of second adder 21. The output terminal of third delay 211 is connected to first input terminal of second adder 212. Output terminal of second adder 212 is connected to output terminal 217. Also, second input terminal 214 is connected to reference value setting section (not illustrated) made up of switches and a central processing device (not illustrated) to input a regulating aperture value. The second input terminal 214 is connected to the second input terminal of aperture level regulator section 205. Third input terminal 215 is connected to reference value setting section (not shown) made up of switches and central processing device (not shown) to input a limiting reference value. Additionally, the third input terminal 215 is connected to the second input terminal of the first limiter 207 and the second input terminal of the second limiter 208. The fourth input terminal 216 is connected to reference value set section (not shown) made up of switches and a central processing device (not shown) to input a gain regulator value. Also, fourth input terminal 216 is connected to a second input terminal of multiplier 210. Section 213 surrounded by a dotted line corresponds to an aperture compensation section to compensate the aperture signal.

A detailed explanation of the operation of the circuit illustrated in FIG. 4 follows with reference to FIGS. 5A through 5H which illustrate output wave forms and compensating characteristics of sections in FIG. 4.

First delay 201 causes a delay to the luminance signal being input across first input terminal 200 for a one line duration (horizontal synchronous signal) to input this luminance signal, delayed for a 1 line duration, to the second delay 202, third delay 211 and differentiator 203. In addition, second delay 202 causes the luminance signal, delayed by a 1 line duration in the first delay 201, to be again delayed for a 1 line duration. This luminance signal, delayed for a 2 line duration, is applied to differentiator 203. Differentiator 203 adds the luminance signal from input terminal 200 to the 2 line duration delayed luminance signal from the second delay 202 and subtracts a luminance signal that has been delayed by a 1 line duration in first delay 201 from the added luminance signal to detect an aperture signal in the vertical direction. Then the aperture signal is generated in the level transition section of the luminance signal and has a strength corresponding to the transition level of the luminance signal.

Figure 5A:
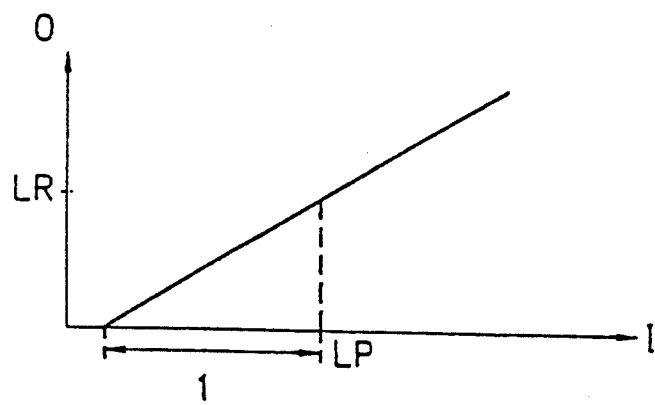
FIGS. 5A through 5H are wave forms of outputs of the respective sections in FIG. 4.

Coring section 204 removes a certain level range aperture signal of plus (+) or minus (−) from the aperture signals supplied from differentiator 203 and supplies only the aperture signal of a plus (+) or minus (−) beyond the predetermined level to second limiter 208 and aperture level regulator section 205, as shown in FIG. 5A.

Figure 5B:
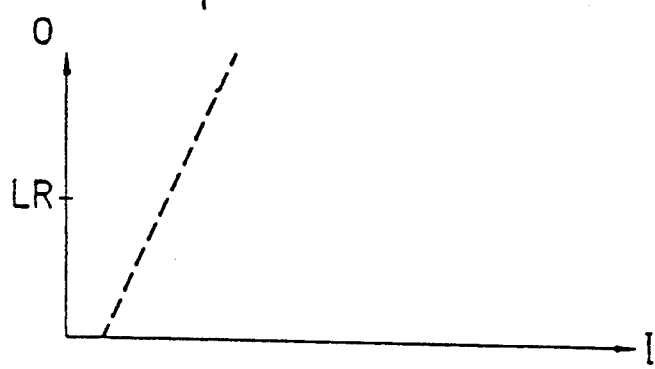

Aperture level regulator section 205 multiplies the aperture signal from the coring section 204 by the aperture regulator value entered through the second input terminal 214 to generate an aperture signal having amplitude corresponding to the power slope shown in FIG. 5B. In addition, the aperture level regulator section 205 supplies the multiplied aperture signal to the excess level regulator section 206.

Figure 5C:
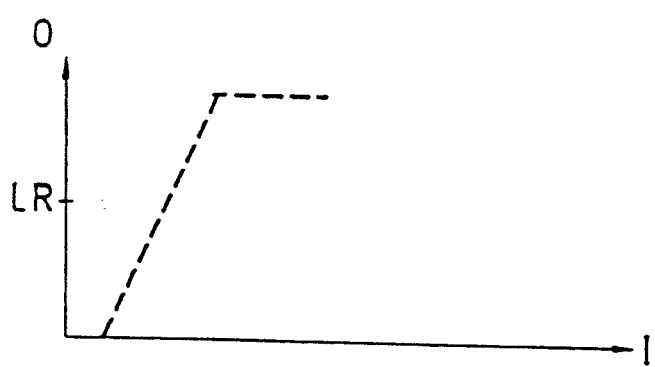

Excess level regulator section 206 overflow-controls the result of the multiplied aperture signal from the aperture level regulator section 205 and supplies the overflow-controlled aperture signal to first limiter 207, as shown in FIG. 5C. FIG. 5C indicates the data limit control according to the number of the used bits when the data is processed in the hardware.

Figure 5D:
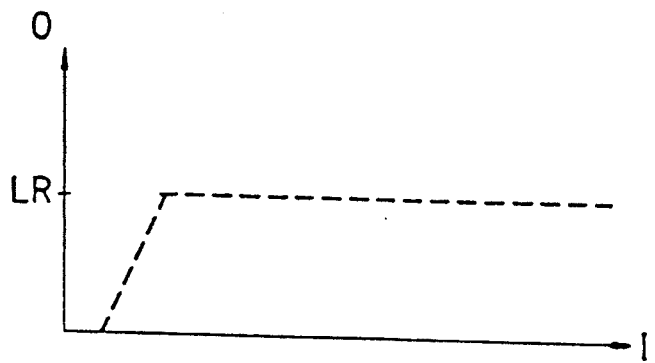

First limiter 207 limits the aperture signal from excess level regulator section 206 to a limiting reference value (LR) input via the third input terminal 215 to apply this aperture signal limited by the limiter reference value (LR) to first adder 209, as shown in FIG. 5D.

Figure 5E:
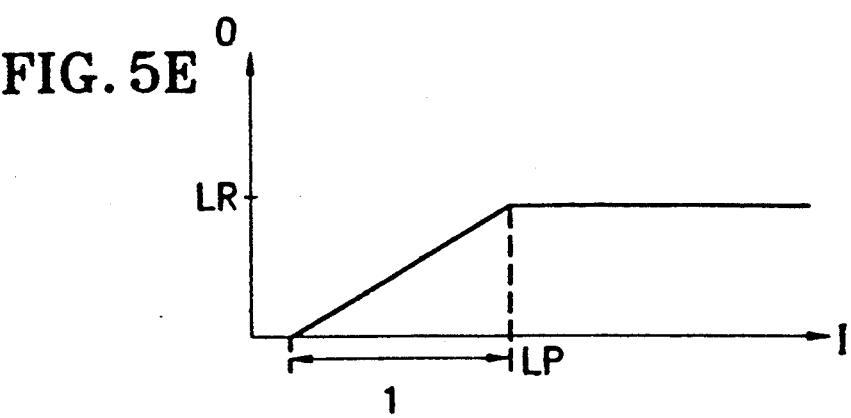

Second limiter 208 limits the aperture signal from coring section 204 to a limiting reference value (LR) entered via the third input terminal to apply this aperture signal that has been limited to the limiting reference value (LR) to first adder 209, as shown in FIG. 5E.

Figure 5F:
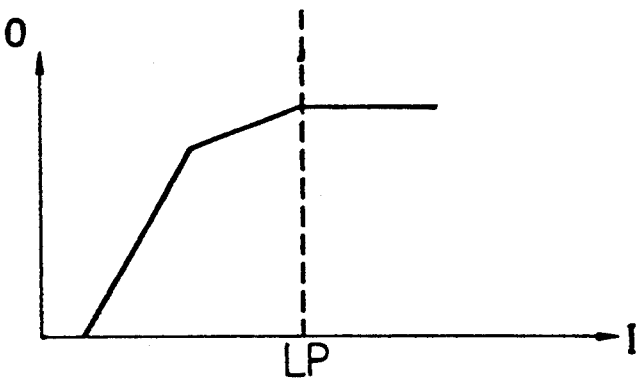
Figure 5G:
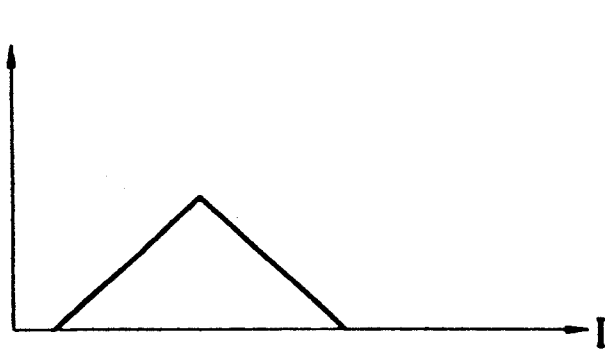

First adder 209 adds the aperture signal from the second limiter 208 to the aperture signal from the first limiter 207 to generate a compensated aperture signal having the strength of the amplitude as shown in FIG. 5F. Also, first adder 209 supplies the compensated aperture signal to multiplier 210. In addition, the amount in which a compensated aperture signal is increased is relative to the amplitude strength of the weak aperture component and the amount in which a compensated aperture signal is reduced is relative to the amplitude strength of a strong aperture component as shown in FIG. 5G.

Figure 5H:
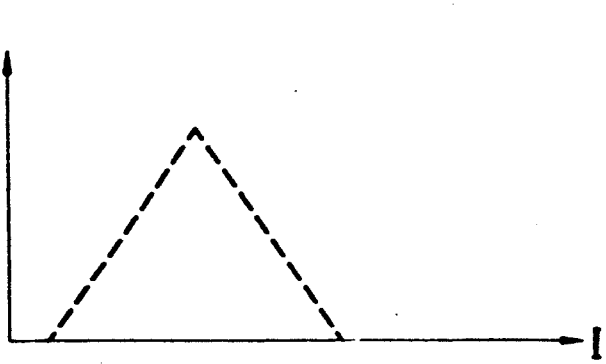

Multiplier 210 multiplies the compensated aperture component from first adder 209 by the gain regulator value entered via fourth input terminal 216 to generate a compensated and gain regulated aperture signal. Multiplier 210 also supplies the compensated and gain regulated aperture signal to the second adder 212. Furthermore, in the compensated and gain regulated aperture signal the slope of the amount of compensation as against the strength of the aperture signal increases by the gain regulator value, as shown in FIG. 5H.

Third delay 211 delays and provides to second adder 212 the luminance signal that was delayed by a one-line duration in first delay 201 to the extent of a propagation delay time in the differentiator 203 and aperture compensator 213.

Second adder 212 adds the aperture signal from the multiplier 210 to the luminance signal from the third delay 211 to generate a luminance signal that is aperture corrected. In addition, second adder 212 outputs a luminance signal that is aperture corrected via output terminal 217. The aperture corrected luminance signal also brings an enlarged compensated aperture signal out of the low section transition level and from a larger transition level section, a decreased compensated aperture signal. In addition, the resolution of the picture displayed is improved by the aperture compensated luminance signal.

Second embodiment of a picture aperture correction circuit according to the present invention is described in detail with reference to FIG. 6.

Figure 6:
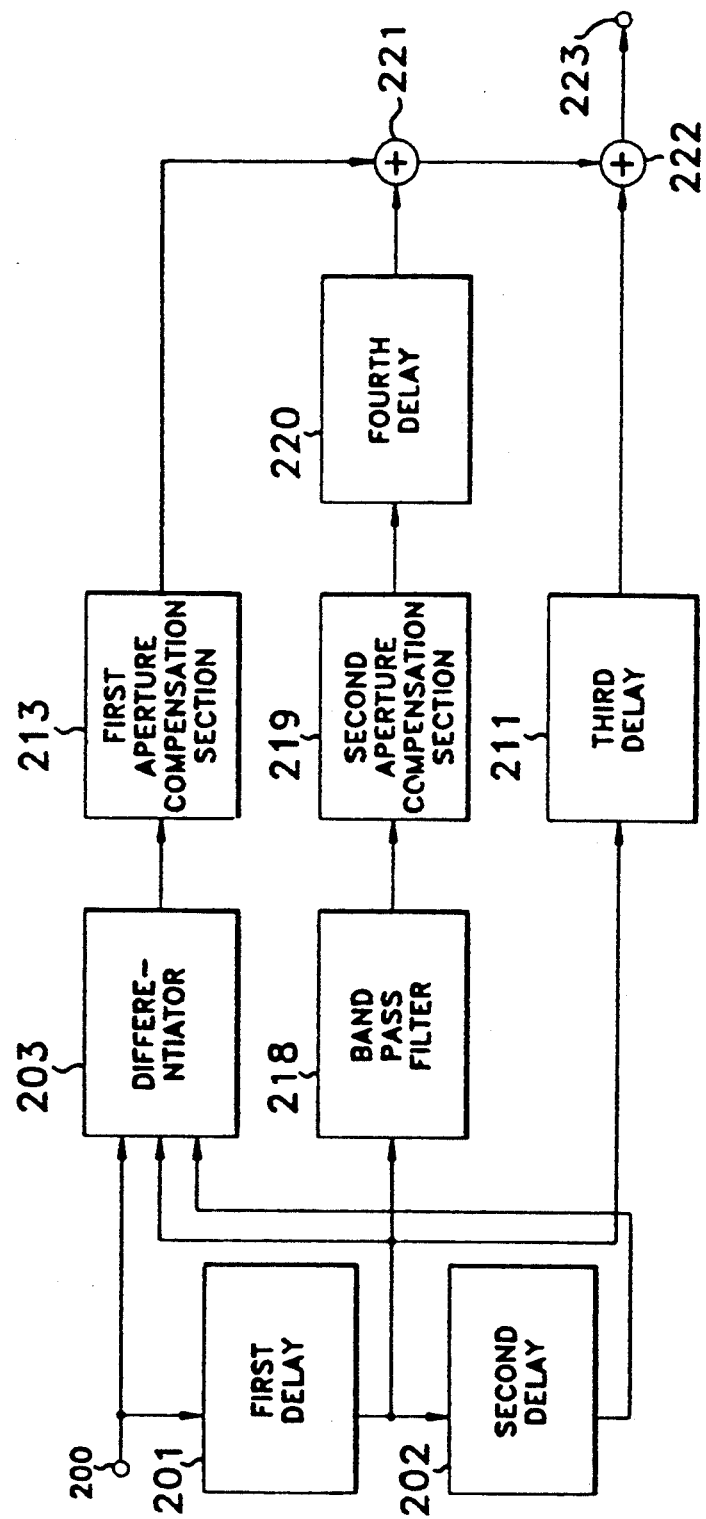
FIG. 6 is a circuit diagram showing another embodiment of a horizontal and vertical aperture correction circuit according to the present invention.

FIG. 6 illustrates a vertical and horizontal aperture correction circuit according to this invention. In FIG. 6, input terminal 200 is connected to a luminance signal source (not shown) to input the luminance signal. Input terminal 200 is also connected to the input terminal of first delay 201 and to the first input terminal of differentiator 203. The output terminal of first delay 201 connects the input terminals of the second delay 202, third delay 211, band pass filter 218 and second input terminal of differentiator 203. Output terminal of second delay 202 connects to the third input terminal of differentiator 203. The output terminal of differentiator 203 is connected to the input terminal of the first aperture compensation section 213 of which output terminal is connected to the first input terminal of first adder 221. The output terminal of band pass filter 218 connects to the input terminal of the second aperture compensation section 219. The output terminal of the second aperture compensation section 219 is connected to input terminal of fourth delay 220. The output terminal of fourth delay 220 is connected to the second input terminal of the first adder 221. The output terminal of the first adder 221 is connected to first input terminal of second adder 222. The output terminal of third delay 211 is connected to second input terminal of the second adder 222. The output terminal of the second adder 222 connects to output terminal 223.

Next is an explanation of the circuit operation illustrated in FIG. 6.

First delay 201 delays the luminance signal input from input terminal 200 for an 1 period and outputs it to second delay 202, third delay 211, differentiator 203 and band pass filter 218.

Second delay 202 again delays the 1 line period delayed luminance signal for another 1 line duration and outputs the 2 line delayed luminance signal to differentiator 203.

Differentiator 203 adds the two-line period delayed luminance signal from the second delay 202 to a luminance signal input from input terminal 200 and subtracts the 1 line period delayed luminance signal received from first delay 201 from the added luminance signal to detect the vertical direction aperture signal. Differentiator 203 also sends the detected vertical aperture signal to first aperture compensation section 213.

First aperture compensation section 213 operates the same as the aperture compensation section 213 as illustrated in FIG. 4 and compensates levels by altering their strength in accordance with the strength of the aperture signal in the vertical direction from differentiator 203. This compensated aperture signal in the vertical direction is input to first adder 221.

Band pass filter 218 detects the aperture signal in the horizontal direction from the luminance signal that has been delayed for a duration of 1 line from the first delay 201 and this detected aperture signal in the horizontal direction is input to the second aperture compensation section 219.

Second aperture compensation section 219 operates the same as the aperture compensation section 213 as illustrated in FIG. 4 and compensates levels by varying their strength in accordance with the strength of the aperture signal in the horizontal direction from band pass filter 218. Second aperture compensation section 219 also inputs the aperture signal compensated in the horizontal direction to the fourth delay 220.

Fourth delay 220 delays the aperture signal in the horizontal direction from the second aperture compensation section 219 as much as the time difference between the propagation delay time within the processing path of the aperture signal in horizontal direction consisting of band pass filter 218 and second aperture compensation section 219 and the propagation delay time within the processing path of the aperture signal in the vertical direction made up of second delay 202, differentiator 203 and first aperture compensation section 213. Fourth delay 220 also outputs the delayed aperture signal in the horizontal direction to first adder 221.

First adder 221 adds the vertical direction aperture signal from the first aperture compensation section 213 and the horizontal direction aperture signal from the fourth delay 220, to generate a 2 dimensional aperture signal which is input to second adder 222.

Third delay 211 delays the luminance signal from first delay 201 to the extent of the propagation delay time of the processing path of the 2 dimensional aperture signal and outputs the delayed luminance signal to second adder 222. Here, the processing path of the 2 dimensional aperture signal is composed of the above mentioned processing paths of the horizontal direction aperture signal, the vertical direction aperture signal and the first adder 221.

Second adder 222 adds the 2 dimensional aperture signal from first adder 221 to the luminance signal from third delay 211 and generates an aperture corrected luminance signal that is 2 dimensional and output through output terminal 223. This 2 dimensional aperture corrected luminance signal also has a greatly compensated aperture signal whose transition level is in the low section and a comparatively small compensated aperture signal whose transition level is in the high section.

As described above, the circuit of the present invention increases the amount of compensation when the strength of the aperture signal separated from the luminance signal is small and decreases the amount of compensation when the strength is great to prevent signal loss to small transition levels by clarifying transfer levels of low luminance signals. The circuit improves the picture definition displayed by an video signal; and prevents generation of impulse noise by aperture correction.

What is claimed is:

1. A vertical aperture correction apparatus, comprising:

an input terminal for receiving a luminance signal;

delay means for delaying said luminance signal for a delayed period to provide a delayed luminance signal;

aperture detector means for detecting an aperture signal in a vertical plane from said luminance signal;

aperture level regulator means for regulating said aperture signal to provide a regulated aperture signal;

first limiter means for limiting said regulated aperture signal within a first defined parameter to provide a first limited signal;

second limiter means for limiting said aperture signal within a second defined parameter to provide a second limited signal;

first adder means for adding said first and second limited signals to provide an aperture compensating signal; and second adder means for adding said aperture compensating signal to said delayed luminance signal to provide an aperture corrected luminance signal in said vertical plane.

2. The vertical aperture correction apparatus as claimed in claim 1, wherein said first and second defined parameters of said first and second limiter means have identical sets of limited values.

3. The vertical aperture correction apparatus as claimed in claim 1, further comprising excess level regulator means interposed between said aperture level regulator means and said first limiter means for limiting said regulated aperture signal within a third defined parameter having a set of limited values.

4. The vertical aperture correction apparatus as claimed in claim 3, further comprising coring means interposed between said aperture signal detector means, said aperture level regulator means and said second limiter means for removing low aperture components representative of high frequency noise signal from said aperture signals.

5. The vertical aperture correction apparatus as claimed in claim 4, further comprised gain regulator means interposed between said first adder means and said second adder means, for multiplying said aperture compensating signal with a selected gain value to regulate magnitude gains of said aperture compensating signal.

6. The vertical aperture correction apparatus as claimed in claim 5, wherein a set of limited values of the aperture signals of said first limiter means and said second limiter means is set to be smaller than a set of limited values of said excess level regulator means.

7. A vertical and horizontal aperture correction apparatus, comprising:

an input terminal for receiving a luminance signal;

first aperture signal detector means for detecting a first aperture signal in a vertical plane from said luminance signal;

first aperture level regulator means for regulating said first aperture signal in dependence upon a slope of said first aperture signal to provide a first regulated aperture signal;

first limiter means for limiting said first regulated aperture signal within a first defined parameter to provide a first limited aperture signal;

second limiter means for limiting said first aperture signal within a second defined parameter to provide a second limited aperture signal;

first adder means for adding said first and second limited aperture signals to provide a first added signal;

second aperture signal detector means for detecting a second aperture signal in a horizontal plane from said luminance signal;

second aperture level regulator means for regulating said second aperture signal in dependence upon detection of a slope of said second aperture signal to provide a second regulated aperture signal;

third limiter means for limiting said second regulated aperture signal within a third defined parameter to provide a third limited aperture signal;

fourth limiter means for limiting said aperture signal within a fourth defined parameter to provide a fourth limited aperture signal;

second adder means for adding said third and fourth limited aperture signals to provide a second added signal;

third adder means for adding said first and second added signals representative of said aperture signals in the vertical and horizontal planes to generate a two-dimensional aperture signal for providing vertical and horizontal aperture compensation to said luminance signal; and fourth adder means for adding said two-dimensional aperture signal to said luminance signal to provide a two-dimensional aperture compensated luminance signal.

8. A vertical and horizontal aperture correction apparatus as claimed in claim 7, wherein said first and second defined parameters of said first and second limiter means have identical set of limited values, and said third and fourth defined parameters of said third and fourth limiter means have identical set of limited values.

9. A vertical aperture correction apparatus, comprising:

means for receiving a video signal;

aperture detector means for detecting aperture components from said video signal in a vertical direction;

coring means for confining said aperture components within a first defined parameter to provide a first intermediate aperture components;

regulator means for regulating said first intermediate aperture components to have a selectable slope and amplitude factors to provide a second intermediate aperture components;

first limiter means for limiting said second intermediate aperture components to first reference values to provide a third intermediate aperture components;

second limiter means for limiting said first intermediate aperture components to second reference values to provide a fourth intermediate aperture components;

first adder means for adding said third and fourth intermediate aperture components to provide aperture compensation components; and second adder means coupled to receive said aperture compensation components and said video signal, for adding said aperture compensation components to said video signal to provide an aperture compensated video signal.

10. The vertical aperture correction apparatus as claimed in claim 9, further comprising delay means for delaying said video signal by at least one horizontal scanning line interval to maintain synchronization between said aperture compensation components and said video signal.

11. The vertical aperture correction apparatus as claimed in claim 9, further comprising multiplier means interposed between said first adder means and said second adder means, for multiplying said aperture compensation components with a selected gain value to regulate magnitude gains of said aperture compensation components.

12. A vertical and horizontal aperture correction apparatus, comprising:
   means for receiving a video signal;
   first detector means for detecting aperture components in a vertical direction in dependance upon reception of said video signal;
   first aperture compensator means for providing first aperture compensation components in dependence upon detection of said aperture components in said vertical direction;
   second detector means for detecting aperture components in a horizontal direction in dependence upon reception of said video signal;
   second aperture compensator means for providing second aperture compensation components in dependence upon detection of said aperture components in said horizontal direction;
   first adder means for adding said first and second aperture compensation components in said vertical and horizontal directions to provide two-dimensional aperture compensation components;
   delay means for delaying said video signal by at least one horizontal scanning line to synchronize said video signal with said two-dimensional aperture compensation components to provide a delayed video signal; and
   second adder means for adding said two-dimensional aperture compensation components to said delayed video signal to provide a two-dimensional aperture compensated video signal.

13. The vertical and horizontal aperture correction apparatus as claimed in claim 12, wherein said second detector means is a band-pass filter.

14. The vertical and horizontal aperture correction apparatus as claimed in claim 12, wherein said first aperture compensator means comprises:
   coring means for confining said aperture components in said vertical direction within a defined parameter to provide a first intermediate aperture components;
   regulator means for regulating said first intermediate aperture components to have a selectable slope and amplitude factors to provide a second intermediate aperture components;
   first limiter means for limiting said second intermediate aperture components to first reference values to provide a third intermediate aperture components;
   second limiter means for limiting said first intermediate aperture components to second reference values to provide a fourth intermediate aperture components;
   means for adding said third and fourth intermediate aperture components to provide said first aperture compensation components in said vertical direction.

15. The vertical and horizontal aperture correction apparatus as claimed in claim 14, wherein said first reference values are identical to said second reference values.

16. The vertical and horizontal aperture correction apparatus as claimed in claim 12, wherein said second aperture compensator means comprises:
   coring means for confining said aperture components in said horizontal direction within a defined parameter to provide a first intermediate aperture components;
   regulator means for regulating said first intermediate aperture components to have a selectable slope and amplitude factors to provide a second intermediate aperture components;
   first limiter means for limiting said second intermediate aperture components to first reference values to provide a third intermediate aperture components;
   second limiter means for limiting said first intermediate aperture components to second reference values to provide a fourth intermediate aperture components;
   means for adding said third and fourth intermediate aperture components to provide said second aperture compensation components in said horizontal direction.

17. The vertical and horizontal aperture correction apparatus as claimed in claim 16, wherein said first reference values are identical to said second reference values.

18. A method for correcting aperture components of a video signal in a vertical direction, comprising the steps of:
   receiving a video signal:
   detecting aperture components from said video signal in a vertical direction;
   confining said aperture components within a first defined parameter to provide a first intermediate aperture components;
   regulating said first intermediate aperture components to have a selectable slope and amplitude factors to provide a second intermediate aperture components;
   limiting said second intermediate aperture components to first reference values to provide a third intermediate aperture components;
   limiting said first intermediate aperture components to second reference values to provide a fourth intermediate aperture components;
   adding said third and fourth intermediate aperture components to provide aperture compensation components;
   delaying said video signal by at least one horizontal scanning line interval to provide a delayed video signal for maintaining synchronization between said video signal and said aperture compensation components; and
   adding said aperture compensation components to said delayed video signal to provide an aperture compensated video signal.

19. The method for correcting aperture components as claimed in claim 18, wherein said first reference values are identical to said second reference values.

20. A method for correcting aperture components of a video signal in vertical and horizontal directions, comprising the steps of:

receiving a video signal;

detecting aperture components in a vertical direction in dependence upon reception of said video signal;

confining said aperture components in said vertical direction within a first defined parameter to provide a first intermediate aperture components;

regulating said first intermediate aperture components to have a selectable slope and amplitude factors to provide a second intermediate aperture components;

limiting said second intermediate aperture components to first reference values to provide a third intermediate aperture components;

limiting said first intermediate aperture components to second reference values to provide a fourth intermediate aperture components;

adding said third and fourth intermediate aperture components to provide aperture compensation components;

delaying said video signal by at least one horizontal scanning line interval to provide a first delayed video signal;

detecting aperture components in a horizontal direction in dependence upon reception of said video signal by band-pass filtering said first delayed video signal;

providing second aperture compensation components in dependence upon detection of said aperture components in said horizontal direction;

adding said first and second aperture compensation components in said vertical and horizontal directions to provide two-dimensional aperture compensation components;

delaying said video signal by at least one horizontal scanning line to synchronize said video signal with said two-dimensional aperture compensation components to provide a delayed video signal; and adding said two-dimensional aperture compensation components to said delayed video signal to provide a two-dimensional aperture compensated video signal.

* * * * *

UNITED STATES PATENT AND TRADEMARK OFFICE
CERTIFICATE OF CORRECTION

PATENT NO. : 5,218,438
DATED : June 8, 1993
INVENTOR(S) : Jeong-hun Kim

It is certified that error appears in the above-indentified patent and that said Letters Patent is hereby corrected as shown below:

Column 2, Line 25, After "112", Insert period -- . -- .

Column 10, Line 42, After "signal", change colon " : " to semicolon -- ; --

Signed and Sealed this

Third Day of October, 1995

Attest:

BRUCE LEHMAN

Attesting Officer    Commissioner of Patents and Trademarks